Patented Oct. 3, 1933

1,929,388

UNITED STATES PATENT OFFICE 1,929,388

MANUFACTURE OF PAVEMENTS

Charles Augustine Mullen, Montreal, Quebec, Canada

No Drawing. Application November 11, 1931
Serial No. 574,361

2 Claims. (Cl. 106—31)

This invention relates to pavements in which the particles or fragments which compose the mineral aggregate are coated and the voids between are more or less filled with a binding material of a plastic nature, which is usually either asphaltic cement or tar or other like material.

More particularly, my invention relates to that type of pavement in which the paving mixture is transported and laid cold, and in which the mixture is prepared by applying to the surfaces of the particles which compose the mineral aggregate, while they are cold or but slightly warm, a priming coat of light volatile oil such as gasoline, naphtha, kerosene, light fuel or burning oil, or the like, and thereafter applying to the particles of the aggregate a coating of the plastic cement in a sufficiently fluid state to coat the particles which have first been primed with the light oil. By reason of the presence of the volatile oil in the resulting mixture, the paving material may be transported and retained for a considerable time without solidification, and in this condition it may be laid and rolled, as a result of which it rapidly hardens enough to bear traffic.

In pavements of this character the priming of the mineral aggregate with a volatile oil, before the application of the cement, serves three purposes;

1. It causes the cement to adhere more readily to the cold or but slightly warmed mineral particles.

2. It immediately fluxes the cement and causes it to spread more rapidly over the particles.

3. It keeps the cement in a softened condition for a sufficient period of time to permit of transportation, handling, laying, and compacting on the road without the necessity of a further heating operation, after which it partly or wholly evaporates, leaving the mixture of the consistency which is desired in the completed road.

According to my invention I separate the means for accomplishing and controlling the first and second functions above named from the means for accomplishing the third function. In this way I overcome a difficulty which has been incident to processes such as I have described. This difficulty is the absorption by the aggregate of a certain undetermined portion of the light volatile oil priming coat into the surface pores of the irregularly shaped mineral particles or fragments of the aggregate. The absorption differs according to the character of the aggregate, and there results uncertainty as to the effective presence upon the particles of the aggregate of the desired amount of the volatile oil required to temporarily flux the bituminous cement and so to permit the mixture to be properly transported, handled, laid and compacted. This difficulty is overcome, or at least controlled, by means of my invention.

In the manufacture of pavements such as I have described it has heretofore been the practice either to add all of the oil to the mineral particles or fragments of the aggregate as a priming coat and thereafter to add the bituminous cement, or else to add a first part or addition of the oil and then the bituminous cement and then the remainder of the oil; but in all cases, the two additions of the oil have been the same in character whether added before or after the application of the cement; for there has, until my invention, been no recognition of the fact that special advantages may be secured by means of a difference in the character of these two additions of light oil. By means of my invention, which recognizes the importance of such differences, important and advantageous results can be obtained which better the future performance of the product in its transportation, handling, laying, and compaction on the road.

In the practice of my invention I employ for the first addition, an oil which is peculiarly adapted to the functions which it is to perform, namely, to facilitate the adhesion of the cement to the mineral particles and to immediately flux the cement when it is added and cause it to spread or diffuse itself. The oil thus added I term a priming oil. The amount of this first addition of priming oil will depend upon the character of the mineral aggregate, particularly its capacity for the absorption of such an oil, sufficient being added to insure the requisite overplus after such absorption. Consequently, the oil may or may not be a volatile oil, the choice and character being dictated by the other considerations which I have named, although usually they are best accomplished by employing a lighter volatile oil than that chosen for the second addition.

After the bituminous binding cement has been added and properly diffused as the result of the first named addition, there is then added another installment of volatile oil of a different character from the first addition, which oil is chosen and in quantities so proportioned as to best accomplish the temporary fluxing of the cement so as to permit its transportation and retention without solidification until laid and compacted while yet insuring a sufficiently rapid solidification after laying to permit the pavement to be soon thrown open to traffic. This second addition I term a temporary fluxing oil. For this purpose a heavier volatile oil is usually to be preferred; but if the paving mixture is to be laid almost immediately, instances will occur where a lighter oil may be used for the second addition. The point of my invention lies in the regard paid to the functions which each of the oil additions are to perform, and the selection of these additions both as to character and quantity of oil in such manner as to make each best perform its separate function. It is in recognition of these separate functions that I have called the first addition a priming oil and the second addition a fluxing oil.

It is common practice in paving mixtures of this character to add to the mixture a small quantity of impalpable mineral powder such as hydrated lime, pulverized lime stone dust, or other fine filler material. This may be added either before or after the addition of the fluxing oil; or, as a useful variation, it may be combined with the fluxing oil in the form of a slurry and there be added with it after the bituminous cement has been poured upon the primed mineral aggregate in the mixer.

As an example of the proper practice of my invention, I may introduce into a mixer a batch of irregularly shaped mineral fragments, broken stone or the like, properly selected as to size or grading, say about 2000 pounds. As this material is churned in the mixer I then add a sufficient quantity of a priming oil consisting of a light fluid oil which will readily penetrate into the surface pores of the mineral fragments and in addition to such penetration, will also spread as a thin film over the surfaces thereof so as to act as a priming coat for the asphalt cement which is about to be applied. This priming oil may be a light volatile oil, such as painter's naphtha or the like, and may be in quantity about five pounds, dependent upon the absorbtive capacity of the stone; but it must be understood that the choice of this addition does not require that the oil be volatile, provided there be available a more satisfactory priming oil not volatile at the temperature necessary to the mixing but capable, when added to the mineral aggregate, of best effecting the adhesion of the cement and its rapid diffusion over the particles and fragments thereof.

As the churning in the mixer proceeds, an asphaltic cement or like bituminous or plastic material is added in the required amount, the temperature being so controlled that it will chill and remain as a film on the primed mineral fragments. Of this cement the quantity to be added may be about 100 pounds.

When the primed aggregate is thus evenly coated with the cement, a second addition of oil is made. This must be a volatile oil such as gasoline, naphtha, kerosene or the like or any combinations of the same with each other or with heavier oils or asphalts which will supply the proper amount of temporary flux to the mixture to control its plasticity for the period during which it is being transported and laid. Of this fluxing oil the addition may be about 7 pounds. The choice of the proper oil for this second addition will depend somewhat upon when and where the mixture is to be used. If it is to be laid the same day, gasoline will serve best. If it is to be shipped to a distance and laid sometime after, say within a week or a month, then a heavier oil such as kerosene will serve to retain the plasticity over the longer period of time, yet without preventing the proper hardening of the mixture after it has been laid and compacted.

It is not possible to give exact proportions, as these obviously depend upon so many factors which must be determined for the specific case. The gravities of the materials, the exact grading of the aggregate, and the available light oils and asphalts, all enter as factors; but the above example will suffice to illustrate the invention to enable any one familiar with this art to practice it.

Having thus described my invention, I claim:

1. The process of producing a paving mixture of the character described which consists in adding to the cold or but slightly warmed mineral aggregate a priming oil which has the capacity to coat the aggregate and to facilitate the diffusion of the next addition, then adding the bituminous cement, and then adding another and dissimilar volatile oil as a temporary fluxing oil whereby the mixture is so softened that it may be transported and laid without the application of heat and yet bear traffic after laying and compaction.

2. The process described in claim 1 as practiced when a light volatile oil is employed for the first or priming addition and a heavier volatile oil applied as the second or fluxing addition.

CHARLES AUGUSTINE MULLEN.